(12) United States Patent
Kim et al.

(10) Patent No.: US 10,243,193 B2
(45) Date of Patent: Mar. 26, 2019

(54) BATTERY PACK

(71) Applicant: LG CHEM, LTD., Seoul (KR)

(72) Inventors: Ki-Youn Kim, Daejeon (KR);
Jun-Yeob Seong, Daejeon (KR);
Young-Sop Eom, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 385 days.

(21) Appl. No.: 14/900,496

(22) PCT Filed: May 12, 2015

(86) PCT No.: PCT/KR2015/004758
§ 371 (c)(1),
(2) Date: Dec. 21, 2015

(87) PCT Pub. No.: WO2015/186911
PCT Pub. Date: Dec. 10, 2015

(65) Prior Publication Data
US 2016/0372736 A1 Dec. 22, 2016

(30) Foreign Application Priority Data

Jun. 5, 2014 (KR) .................. 10-2014-0068470

(51) Int. Cl.
*H01M 2/30* (2006.01)
*H01M 2/26* (2006.01)
*H01M 2/10* (2006.01)
(Continued)

(52) U.S. Cl.
CPC ........... *H01M 2/30* (2013.01); *B60L 11/1879* (2013.01); *H01M 2/06* (2013.01); *H01M 2/1072* (2013.01);
(Continued)

(58) Field of Classification Search
CPC ............ H01M 10/42; H01M 2/34; H01M 2/30
See application file for complete search history.

(56) References Cited

U.S. PATENT DOCUMENTS

| 8,609,276 B2 | 12/2013 | Han et al. |
|---|---|---|
| 9,099,695 B2 | 8/2015 | Baek et al. |

(Continued)

FOREIGN PATENT DOCUMENTS

| EP | 2 187 465 A1 | 5/2010 |
|---|---|---|
| JP | 3964626 B2 | 8/2007 |

(Continued)

OTHER PUBLICATIONS

Fuse definition (no date given).*

(Continued)

*Primary Examiner* — Ula C Ruddock
*Assistant Examiner* — Gregory A Passa
(74) *Attorney, Agent, or Firm* — Birch, Stewart, Kolasch & Birch, LLP

(57) ABSTRACT

Disclosed is a battery pack with an improved structure to support a torque applied to a terminal bolt when a nut is coupled to the terminal bolt which is exposed out of the battery pack and serves as a connection terminal. The battery pack includes a cell assembly having a plurality of secondary batteries, a pack housing having an inner space to accommodate the cell assembly therein, a terminal bolt configured to protrude out of the pack housing, a center plate located at an upper portion of the cell assembly in the inner space of the pack housing and having an insert groove formed therein, and a bus bar having one end electrically connected to an electrode terminal of the cell assembly and the other end connected to the terminal bolt by contact, the bus bar being inserted into the insert groove of the center plate.

14 Claims, 9 Drawing Sheets

(51) Int. Cl.
*H01M 2/20* (2006.01)
*H01M 2/34* (2006.01)
*B60L 11/18* (2006.01)
*H01M 2/06* (2006.01)
*H01M 10/42* (2006.01)
*H01M 10/48* (2006.01)

(52) U.S. Cl.
CPC ......... *H01M 2/1077* (2013.01); *H01M 2/206* (2013.01); *H01M 2/26* (2013.01); *H01M 2/305* (2013.01); *H01M 2/34* (2013.01); *B60L 2270/145* (2013.01); *H01M 2/1094* (2013.01); *H01M 2/345* (2013.01); *H01M 2/347* (2013.01); *H01M 10/425* (2013.01); *H01M 10/482* (2013.01); *H01M 2010/4271* (2013.01); *H01M 2200/00* (2013.01); *H01M 2220/20* (2013.01); *Y02T 10/7011* (2013.01); *Y02T 10/7055* (2013.01)

(56) References Cited

U.S. PATENT DOCUMENTS

| | | |
|---|---|---|
| 2002/0114994 A1 | 8/2002 | Yabuki et al. |
| 2012/0231324 A1 | 9/2012 | Brisbane |
| 2012/0301747 A1* | 11/2012 | Han ............... H01M 2/1005 429/7 |
| 2013/0189563 A1 | 7/2013 | Chang et al. |
| 2014/0087229 A1 | 3/2014 | Watanabe et al. |
| 2015/0236326 A1 | 8/2015 | Kim et al. |

FOREIGN PATENT DOCUMENTS

| | | |
|---|---|---|
| JP | 2002-134098 A1 | 5/2010 |
| JP | 2012-243689 A | 12/2012 |
| KR | 10-2011-0057502 A | 6/2011 |
| KR | 10-2011-0112082 A | 10/2011 |
| KR | 10-2012-0005726 A | 1/2012 |
| KR | 10-2013-0023059 A | 3/2013 |
| KR | 10-2014-0040629 A | 4/2014 |
| KR | 10-2014-0060633 A | 5/2014 |
| WO | WO 2010148224 | * 12/2010 |

OTHER PUBLICATIONS

International Search Report, issued in PCT/KR2015/004758, dated Aug. 25, 2015.
Written Opinion of the International Searching Authority, issued in PCT/KR2015/004758, dated Aug. 25, 2015.

* cited by examiner

BATTERY PACK

TECHNICAL FIELD

The present disclosure relates to a battery pack, and more particularly, to a battery pack with an improved structure to support a torque applied to a terminal bolt when a nut is coupled to the terminal bolt which is exposed out of the battery pack and serves as a connection terminal.

The present application claims priority to Korean Patent Application No. 10-2014-0068470 filed on Jun. 5, 2014 in the Republic of Korea, the disclosures of which are incorporated herein by reference.

BACKGROUND ART

Recently, with the active development of electric vehicles, storage batteries, robots, satellites, and the like, along with the dramatically increasing demand for portable electronic products such as laptop computers, video cameras, mobile phones, and the like, research and development for high-performance secondary batteries capable of repeatedly charging and discharging has been actively made.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and an negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can type secondary battery where the electrode assembly is included in a metal can and a pouch type battery where the electrode assembly is included in a pouch of an aluminum laminate sheet, depending on the shape of the exterior.

In these days, secondary batteries are widely used not only for small-sized devices such as portable electronic devices but also for middle-sized or large-sized devices such as vehicles and power storages. In particular, along with exhaustion of carbon energy and increased interest on environments, the public attention is focused on hybrid vehicles and electric vehicles over the world, including USA, Europe, Japan and Korea. In such hybrid vehicles and electric vehicles, one of the most important parts is a battery pack which gives a driving force to a vehicle motor. A hybrid vehicle or an electric vehicle ensures better fuel efficiency and exhausts no or less pollutant substances since a driving force for a vehicle is obtained by charging/discharging a battery pack. Due to various advantages such as above, more and more vehicle users select such hybrid vehicles and electric vehicles.

A battery pack of the hybrid-electric vehicle or the electric vehicle generally includes a plurality of secondary batteries, and the plurality of secondary batteries are connected to each other in series or in parallel to enhance capacity and output. A general battery pack, for example a battery pack for a vehicle, includes a cell assembly in which a plurality of secondary batteries are stacked, and a pack housing for accommodating the cell assembly in an inner space thereof. In addition, in order to use the battery pack, the battery pack should be electrically connected to an external device by means of a connection member such as a connection wire, and for this connection, a connection terminal may be provided to the battery pack.

The connection terminal may be formed with various shapes. As a representative shape of the connection terminal, a thread may be formed at an outer side of the terminal so that a connection member is coupled to an outer side of the connection terminal, and a coupling member such as a nut is coupled thereon so that the coupled state between the connection terminal and the connection member may be fixed. At this time, since a thread is formed on the outer side of the connection terminal to have a bolt shape, the connection terminal is also called a terminal bolt.

However, a torque may be applied to the terminal bolt while a coupling member such as a nut is being coupled, and the terminal bolt should not be easily damaged or deformed due to the torque. In particular, since a hybrid-electric vehicle or an electric vehicle may be frequently exposed to strong vibrations in use, the coupling member such as a nut should be strongly coupled to the terminal bolt, and thus a stronger torque may be applied to a terminal bolt of a battery pack for a vehicle. Therefore, there is needed a battery pack which is not damaged or deformed by a strong torque. Further, a battery pack used for a vehicle is a middle-sized or large-sized battery pack with high voltage and high capacity. Thus, damage or deformation of the terminal bolt or peripheral parts may lead to more serious damages such as fire, explosion or electric short. Therefore, a battery pack for a vehicle may be regarded as having more strict requirements on torque-related performance for a terminal bolt or the like.

DISCLOSURE

Technical Problem

The present disclosure is designed to solve the problems of the related art, and therefore the present disclosure is directed to providing a battery pack, which may effectively prevent damage or deformation of a terminal bolt by improving a structure to support a torque applied to the terminal bolt when a nut is coupled to the terminal bolt; and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, which includes a cell assembly having a plurality of secondary batteries; a pack housing having an inner space to accommodate the cell assembly therein; a terminal bolt configured to protrude out of the pack housing; a center plate located at an upper portion of the cell assembly in the inner space of the pack housing and having an insert groove formed therein; and a bus bar having one end electrically connected to an electrode terminal of the cell assembly and the other end connected to the terminal bolt by contact, the bus bar being inserted into the insert groove of the center plate.

Preferably, the bus bar may have a bent portion, and the bent portion may be inserted into the insert groove of the center plate.

Also preferably, the bent portion may be bent in a lower direction, the insert groove of the center plate may be formed in a lower direction, and the bent portion may be inserted into the insert groove in a lower direction from an upper side.

Also preferably, the bent portion may be formed at a terminal of the other end of the bus bar.

Also preferably, the bus bar may have at least two bent portions and at least two insert grooves formed therein.

Also preferably, the terminal bolt may have a cover protrusion inserted into the insert groove together with the bent portion to surround at least a part of the bent portion.

Also preferably, the terminal bolt may have a body, an upper protrusion and a lower protrusion.

Also preferably, a thread may be formed in an outer side of the upper protrusion so that a nut is coupled thereto.

Also preferably, a coupling hole may be formed in the other end of the bus bar, the lower protrusion may be formed at least partially to pass the coupling hole of the bus bar, and a thread may be formed in an outer side of the lower protrusion for the coupling of a nut thereto.

Also preferably, the bus bar may come into contact with at least a part of a lower surface of the body of the terminal bolt and at least a part of a side of the body of the terminal bolt.

Also preferably, the bus bar may be placed on an upper portion of the center plate. Also preferably, at least one of a battery management system (BMS), a current sensor, a relay and a fuse may be mounted to an upper portion of the center plate.

Also preferably, the terminal bolt may protrude out through a through hole of the pack housing, and a sealing member for sealing a space between the terminal bolt and the through hole may be further provided.

In another aspect, of the present disclosure, there is also provided a vehicle, which includes the battery pack according to the present disclosure.

Advantageous Effects

In one aspect of the present disclosure, there is provided a battery pack having an improved structure capable of support a torque applied to a terminal bolt when a coupling member such as a nut is coupled to the terminal bolt by turning.

Therefore, in this aspect of the present disclosure, it is possible to effectively prevent the terminal bolt from being damaged or deformed by a torque.

In particular, a battery pack frequently exposed to strong impacts or vibrations and having high performance, for example a battery pack for a vehicle, has strict requirements on torque-related performance, and the present disclosure may provide a battery pack which may meet such strict torque conditions.

Therefore, in one aspect of the present disclosure, it is possible to prevent the battery pack from breaking down due to damage or deformation of the terminal bolt or peripheral parts due to a torque, and it is also possible to prevent the battery pack from causing fire, explosion or electric short due to such damage or deformation.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
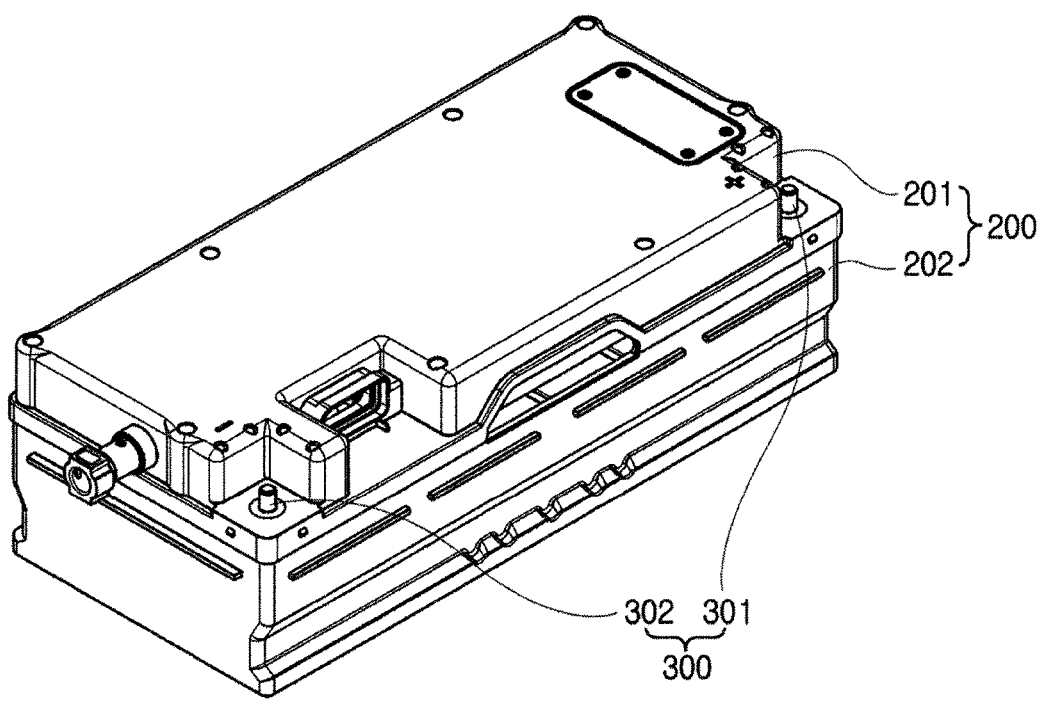
FIG. 1 is a perspective view schematically showing a battery pack according to an embodiment of the present disclosure.
Figure 2:
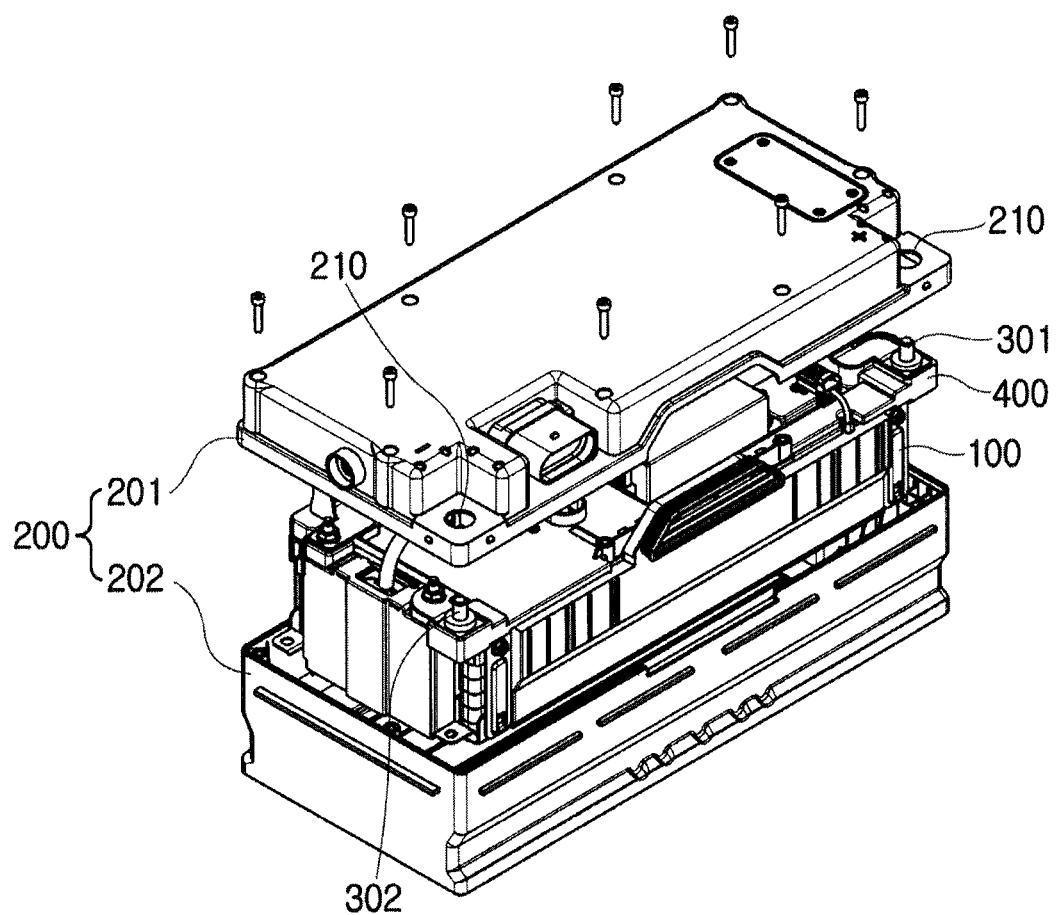
FIG. 2 is an exploded perspective view showing the battery pack of FIG. 1.

FIG. 1 is a perspective view schematically showing a battery pack according to an embodiment of the present disclosure, and FIG. 2 is an exploded perspective view showing the battery pack of FIG. 1.

Figure 3:
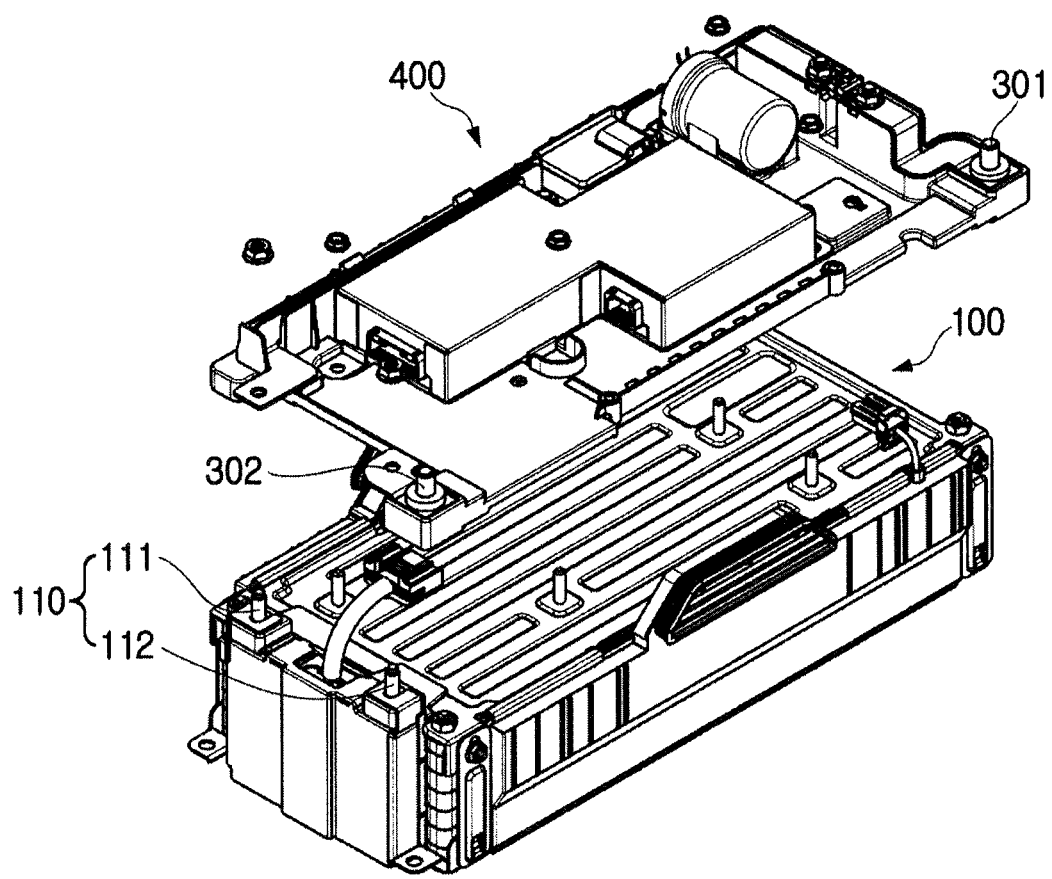
FIG. 3 is a perspective view showing a partial configuration of the battery pack of FIG. 2.
Figure 4:
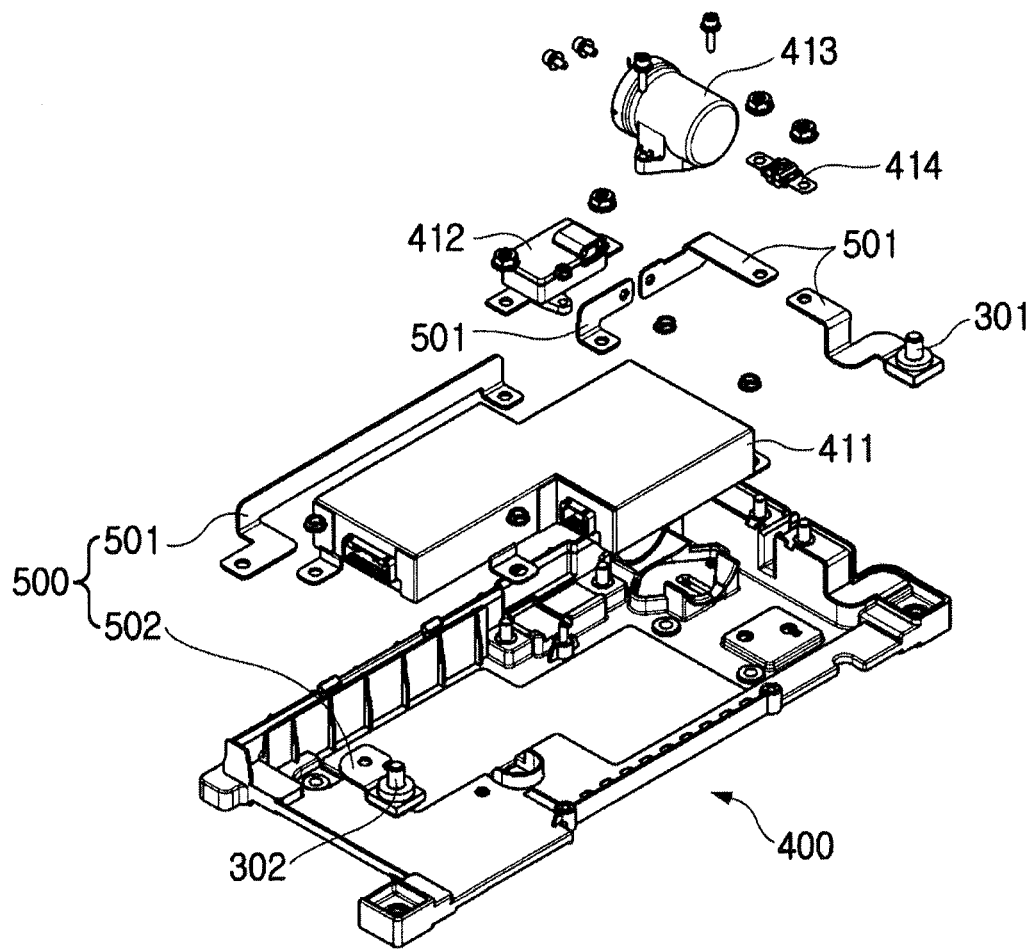
FIG. 4 is an exploded perspective view showing a partial configuration of the battery pack of FIG. 3.

Also, FIG. 3 is a perspective view showing a partial configuration of the battery pack of FIG. 2, and FIG. 4 is an exploded perspective view showing a partial configuration of the battery pack of FIG. 3.

Referring to FIGS. 1 to 4, a battery pack according to the present disclosure includes a cell assembly 100, a pack housing 200, a terminal bolt 300, a center plate 400 and a bus bar 500.

The cell assembly 100 includes at least one secondary battery. In particular, in the battery pack, the cell assembly 100 may be a secondary battery assembly having a plurality of secondary batteries. Here, the plurality of secondary batteries may be pouch-type secondary batteries. In this case, the pouch-type secondary battery may be stacked in one direction, for example in a vertical direction.

Meanwhile, the cell assembly 100 may include a stacking frame for stacking pouch-type secondary batteries. The stacking frame is a component used for stacking secondary batteries. The stacking frame may hold a secondary battery to prevent its movement, and be configured to be stackable to guide assembling of secondary batteries. The stacking frame may also be called with various terms such as a cartridge and have a rectangular ring shape with a hollow center. In this case, four edges of the stacking frame may be located at an outer circumference of a pouch-type secondary battery.

The pack housing 200 has a vacant inner space and may accommodate the cell assembly 100 in the inner space. The pack housing 200 may play a role of a cladding of a battery pack and thus may give structural stability to the battery pack and protect components such as the cell assembly 100 accommodated therein against external physical factors such as impacts or materials.

Meanwhile, as shown in FIGS. 1 and 2, the pack housing 200 may include a lower housing 202 and an upper housing 201. At this time, the lower housing 202 may be shaped to have an open top and an accommodation space therein, and the upper housing 201 may be configured to cover an upper open portion of the lower housing 202. Here, the upper housing 201 may also be formed to have a predetermined accommodation space. In addition, after inner components such as the cell assembly 100 are mostly accommodated in the lower housing 202, the upper housing 201 is coupled to the upper portion of the lower housing 202. At this time, rims of the lower housing 202 and the upper housing 201 may be coupled to each other by means of coupling members such as bolts.

The terminal bolt 300 is connected to the cell assembly 100 and provides a connection terminal so that the cell assembly 100 is electrically connected to an external device. Generally, the battery pack should include both a positive electrode terminal and a negative electrode terminal as the connection terminal, and thus the terminal bolt 300 may also include a positive electrode terminal bolt 301 and a negative electrode terminal bolt 302. In addition, the terminal bolt 300 may be shaped to protrude out of the pack housing 200 for easier connection with an external device. For this, as shown in FIG. 2, a through hole 210 may be formed in the pack housing 200, particularly in the upper housing 201, and a part of the terminal bolt 300 may be exposed out of the pack housing 200 through the through hole 210.

The center plate 400 may be configured to have a plate shape with wide upper and lower surfaces. Also, the center plate 400 may be located at an upper portion of the cell assembly 100 in the inner space of the pack housing 200. In addition, the terminal bolt 300 may be mounted to the center plate 400.

The bus bar 500 is a component provided between the cell assembly 100 and the terminal bolt 300 to electrically connect them to each other. For this, one end of the bus bar 500 may be electrically connected to an electrode terminal 110 of the cell assembly 100, and the other end of the bus bar 500 may be connected to the terminal bolt 300 by direct contact.

In particular, the electrode terminal 110 of the cell assembly 100 may include a positive electrode assembly terminal 111 and a negative electrode assembly terminal 112, and the terminal bolt 300 may also include a positive electrode terminal bolt 301 and a negative electrode terminal bolt 302. For this reason, the bus bar 500 may also include a positive electrode bus bar 501 and a negative electrode bus bar 502. In this case, the positive electrode bus bar 501 may electrically connect the positive electrode assembly terminal 111 to the positive electrode terminal bolt 301, and the negative electrode bus bar 502 may electrically connect the negative electrode assembly terminal 112 to the negative electrode terminal bolt 302. As described above, the bus bar 500 is a component for electrical connection and thus may be made of material with electric conduction. In particular, in order to ensure mechanical strength to some extent, the bus bar 500 may be made of metallic material such as copper.

Meanwhile, there may be provided two or more positive electrode bus bars 501 or two or more negative electrode bus bars 502. For example, as shown in FIG. 2, the positive electrode bus bar 501 may be composed of four unit bus bars 500, and the negative electrode bus bar 502 may be composed of a single unit bus bar 500. Here, four positive electrode unit bus bars 500 may be directly connected to each other or connected to each other by means of an electric part such as a current sensor, a relay, a fuse or the like.

As described above, the terminal bolt 300 may be electrically connected to the cell assembly 100 to serve as an outer terminal of the battery pack and be configured to be connected to an external device such as a motor or a charger in order to charge or discharge secondary batteries provided at the cell assembly 100. At this time, an external device may be directly connected to the terminal bolt 300, or a connection member for connecting an external device may be connected thereto.

Here, a nut may be coupled to the terminal bolt 300 in order to facilitate easier connection to such an external device or such a connection member and also to ensure secure fixation in a connected state.

Figure 5:
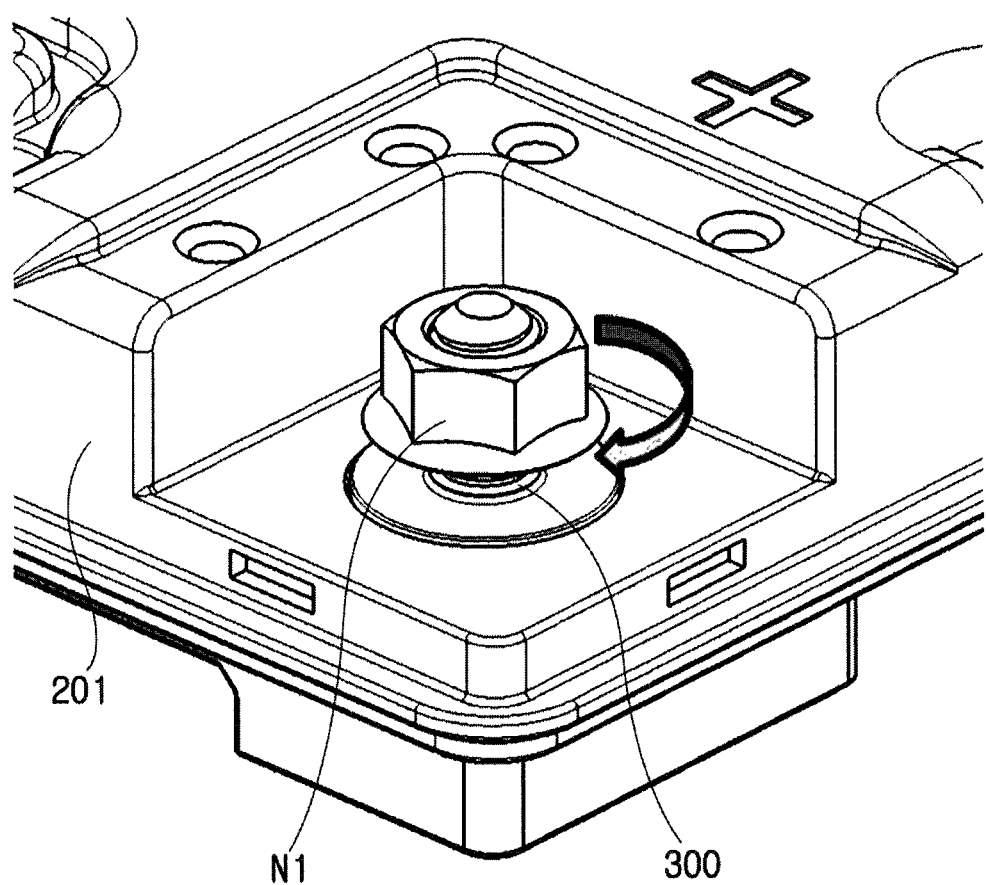
FIG. 5 is a schematic enlarged view showing a partial configuration where a single terminal bolt is located at a battery pack according to an embodiment of the present disclosure.
Figure 6:
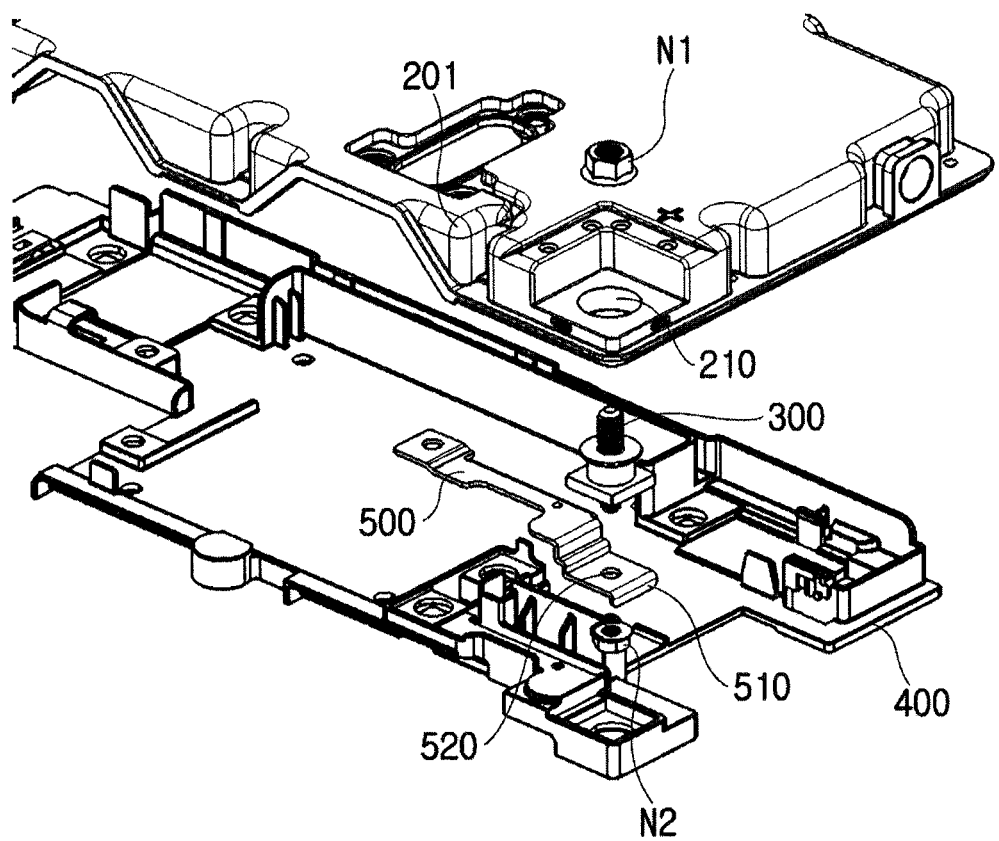
FIG. 6 is an exploded perspective view schematically showing a partial configuration of the battery pack where the terminal bolt depicted in FIG. 5 is located.
Figure 7:
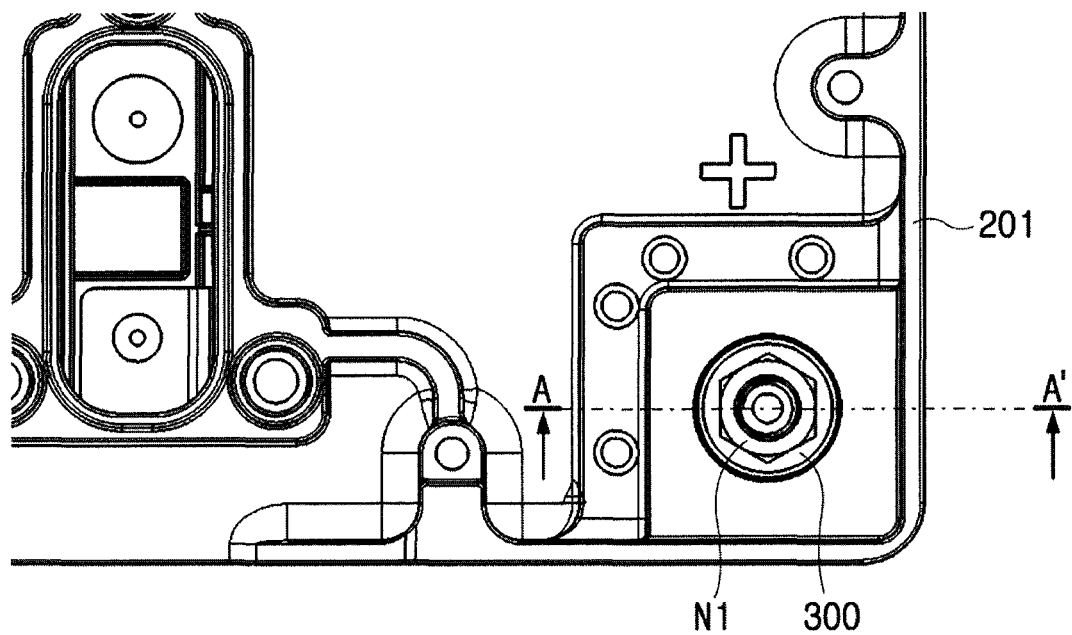
FIG. 7 is a top view of FIG. 5.
Figure 8:
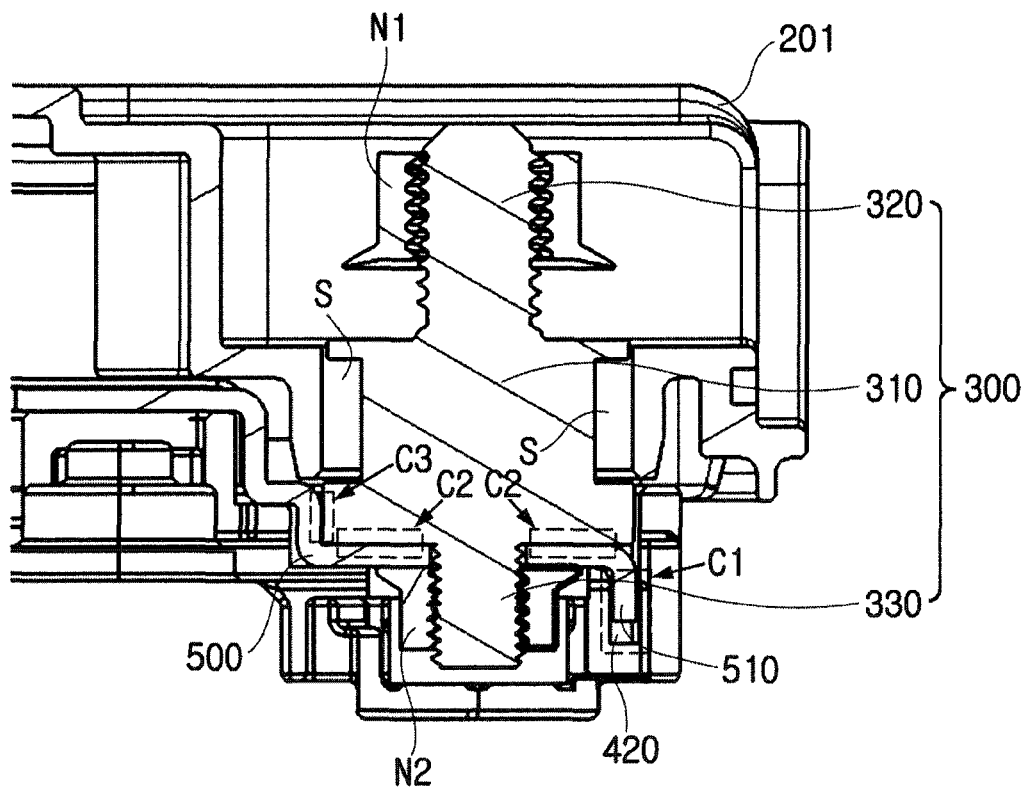
FIG. 8 is a cross-sectional view, taken along the line A-A' of FIG. 7.

FIG. 5 is a schematic enlarged view showing a partial configuration where a single terminal bolt 300 is located at a battery pack according to an embodiment of the present disclosure, FIG. 6 is an exploded perspective view schematically showing a partial configuration of the battery pack where the terminal bolt 300 depicted in FIG. 5 is located, FIG. 7 is a top view of FIG. 5, and FIG. 8 is a cross-sectional view, taken along the line A-A' of FIG. 7.

Referring to FIGS. 5 to 8, a nut may be coupled to the terminal bolt 300, and for coupling the nut, a thread may be formed in at least a part of the terminal bolt 300. In this case, the nut may be coupled to the terminal bolt 300 by turning as indicated by an arrow in FIG. 5.

In particular, in the battery pack according to the present disclosure, as indicated by C1 in FIG. 8, at least a part of the bus bar 500 may be configured to be inserted into and coupled to the center plate 400. In other words, the terminal bolt 300 and the bus bar 500 may be placed on the center plate 400, and at this time, an insert groove 420 may be formed in the center plate 400. In addition, a part of the bus bar 500 may be inserted into the insert groove 420 of the center plate 400.

In this configuration of the present disclosure, the bus bar 500 inserted into the center plate 400 may support and relieve the torque applied to the terminal bolt 300. In other words, as shown in FIG. 5, when the nut is coupled to the terminal bolt 300 and turned, a torque may be applied to the terminal bolt 300. At this time, if the bus bar 500 is inserted into and coupled to the center plate 400 as described above, the coupled structure of the bus bar 500 and the center plate 400 prevents the terminal bolt 300 from turning and also absorbs a part of the torque applied to the terminal bolt 300 to distribute and weaken the torque. Therefore, in this aspect of the present disclosure, even though a strong torque is applied to the terminal bolt 300, it is possible to prevent the terminal bolt 300 and peripheral parts from being damaged or deformed.

In particular, as shown in FIGS. 6 and 8, the bus bar 500 may include a bent portion 510 which is partially bent. In addition, the bent portion 510 of the bus bar 500 may be inserted into the insert groove 420 of the center plate 400 so that the bus bar 500 is inserted into and coupled to the center plate 400.

Preferably, the bent portion 510 of the bus bar 500 may be bent in a lower direction as shown in the figure. In addition, the insert groove 420 of the center plate 400 may also be formed in a lower direction in the upper surface of the center plate 400, corresponding to the shape of the bent portion 510. In this case, since the bent portion 510 of the bus bar 500 is inserted into the insert groove 420 of the center plate 400 at an upper portion of the center plate 400, the bus bar 500 may be inserted into and coupled to the center plate 400.

In this embodiment, in order to insert the bent portion 510 of the bus bar 500 into the insert groove 420 of the center plate 400, the bus bar 500 is placed on the upper portion of the center plate 400 and also the bent portion 510 is positioned to be fit into the insert groove 420. In this case, the bus bar 500 may be assembled to the center plate 400 in a simple way.

Also preferably, the bent portion 510 may be formed at a terminal of the other end of the bus bar 500. In other words, referring to FIG. 8, the bus bar 500 may be configured to elongate in a right direction at a left side so that the terminal bolt 300 may come into contact with and be coupled to a right end thereof. At this time, a tip of the right end of the bus bar 500, namely a right tip, may be bent in a lower direction, and the right tip may serve as the bent portion 510 and be inserted into the insert groove 420 of the center plate 400.

As described above, if the bent portion 510 is formed at a terminal of the bus bar 500, the bent portion 510 of the bus bar 500 may be easily assembled to the center plate 400, and thus the battery pack may be manufactured within a shorter time.

However, the present disclosure is not limited to the above configuration, and the bent portion 510 may also be formed at a predetermined intermediate point, instead of a terminal of the bus bar 500. For example, the bus bar 500 may extend in a right direction at a left side so that its right end is coupled to the terminal bolt 300, and a protrusion, or a U-shaped bent portion 510, may be formed at a left portion of the terminal bolt 300. Also, the insert groove 420 may be formed at a portion of the center plate 400 corresponding to the protrusion. In this case, the protrusion, or the U-shaped bent portion 510, may be inserted into the insert groove 420.

Meanwhile, in the battery pack according to the present disclosure, as described in FIG. 8, the terminal bolt 300 may include a body 310, an upper protrusion 320 and a lower protrusion 330.

Here, the body 310 may be a component which comes into direct contact with the bus bar 500. For example, as shown in FIG. 8, the terminal bolt 300 may be configured so that a lower portion of the body 310 comes into contact with the upper portion of the bus bar 500. Thus, the body 310 of the terminal bolt 300 may be regarded as a portion directly connected to the bus bar 500.

The upper protrusion 320 may be configured to protrude upwards on the body 310 of the terminal bolt 300, and as shown in FIG. 8, a nut N1 may be coupled thereto. In addition, the upper protrusion 320 may be at least partially exposed out of the pack housing 200 through the through hole 210 of the pack housing 200. Meanwhile, a thread may be formed in an outer surface of the upper protrusion 320 so that the nut N1 may be coupled thereto. In addition, an external device or a connection member for connection with the external device may be connected to the upper protrusion 320, in addition to the nut N1.

The lower protrusion 330 may be configured to protrude in a lower direction at the body 310 of the terminal bolt 300. In addition, the lower protrusion 330 may be coupled to the bus bar 500 at least partially through the bus bar 500. For this, as shown in the figure, a coupling hole 520 may be formed at the other end of the bus bar 500 which comes in contact with the terminal bolt 300, and the lower protrusion 330 may be configured through the coupling hole 520 of the bus bar 500.

Here, in order to reinforce a coupled state between the terminal bolt 300 and the bus bar 500 coupled to each other, a thread may be formed in an outer surface of the lower protrusion 330, and the lower protrusion 330 may be coupled and fixed to a nut N2 by using the thread. In this configuration of the present disclosure, since the bus bar 500 is interposed between the body 310 of the terminal bolt 300 and the nut N2, the coupled state between the bus bar 500 and the terminal bolt 300 may be secured.

Here, two or more lower protrusions 330 may be provided at the terminal bolt 300. In addition, corresponding to such a plurality of lower protrusions 330, a plurality of coupling holes 520 may be formed in the bus bar 500. In this configuration of the present disclosure, when a single terminal bolt 300 and a single bus bar 500 are coupled, a plurality of lower protrusions 330 and a plurality of coupling holes 520 are coupled, which ensures more secure coupling between the terminal bolt 300 and the bus bar 500 and also more effectively supports the torque applied to the terminal bolt 300.

Preferably, the bus bar 500 may be configured to come into contact with at least a part of the lower surface of the body 310 of the terminal bolt 300 and at least a part of the side of the body 310 of the terminal bolt 300. In other words, the bus bar 500 is mounted to the upper portion of the center plate 400 so that its flat portions are oriented in upper and lower directions, and the body 310 of the terminal bolt 300 is placed on the upper portion thereof. Therefore, as indicated by C2 in FIG. 8, the bus bar 500 may come into contact with the lower portion of the body 310.

In addition, as indicated by C3 in FIG. 8, the bus bar 500 may be configured to come into contact with at least a part of the side of the body 310. For this, the bus bar 500 may be bent at a lower tip of the body 310 to surround at least a part of the side of the body 310. In this case, the bus bar 500 may come into contact with the side of the body 310 as well as the lower portion of the body 310.

In this configuration of the present disclosure, since a contact surface area between the bus bar 500 and the terminal bolt 300 increases, the bus bar 500 and the terminal bolt 300 may be electrically connected more stably, and an electric resistance may be reduced at a connection portion thereof. Moreover, since the bus bar 500 is configured to surround the side of the body 310, when the nut N1 is coupled to the upper protrusion 320 of the terminal bolt 300 and turned, the torque applied to the terminal bolt 300 may be supported and distributed.

Preferably, in the battery pack according to an embodiment of the present disclosure, the terminal bolt 300 may include a sealing member.

The sealing member is a component for sealing a space between the terminal bolt 300 and the through hole 210 so that the space may be closed. For example, the terminal bolt 300 may have an O-ring shaped sealing member at a portion indicated by S in FIG. 8. In addition, when the upper protrusion 320 of the terminal bolt 300 passes through the through hole 210 of the pack housing 200, the sealing member may seal the space between the body 310 of the terminal bolt 300 and the through hole 210.

In this configuration of the present disclosure, due to the sealing member, it is possible to prevent a gas generated in the battery pack from discharging out through a gap between the terminal bolt 300 and the pack housing 200. In addition, it is also possible to prevent external moisture or impurities from penetrating into the battery pack through such a gap.

Meanwhile, the bus bar 500 may be placed on the upper portion of the center plate 400. The center plate 400 may be located at the upper portion of the cell assembly 100 inside the pack housing 200. At this time, the center plate 400 may be coupled to the upper portion of the cell assembly 100 by using a coupling member such as a bolt. In addition, as shown in FIGS. 6 and 8, a placing portion is formed at the center plate 400 so that the bus bar 500 may be placed thereon, and the bus bar 500 may be placed on the placing portion of the center plate 400. In particular, as indicated by C3 in FIG. 8, the bus bar 500 may be partially bent, and the placing portion of the center plate 400 may be shaped corresponding to the bent shape of the bus bar 500. Further, the bus bar 500 may be bent again at an inner side of the portion indicated by C3 (a left side in FIG. 8), and in this case, the center plate 400 may also have a placing portion shaped corresponding to such a double-bent shape. In this configuration of the present disclosure, rigidity and mechanical supporting force of the bus bar 500 may be reinforced, and the torque applied to the terminal bolt 300 may be supported more strongly.

Preferably, as shown in FIGS. 3 and 4, electric parts, such as a battery management system (BMS) 411, a current sensor 412, a relay 413 and a fuse 414 may be mounted to the upper portion of the center plate 400.

Here, the BMS (Battery Management System) 411 represents a battery management unit for controlling charging/discharging operations of a battery pack as a whole, and the BMS 411 may be generally regarded as a component included in a battery pack.

In addition, the current sensor 412 senses a charging/discharging current of the battery pack, and the relay 413 is a switching unit for selectively opening or closing a charging/discharging path on which a charging/discharging current of the battery pack flows. In addition, the fuse 414 is provided on the charging/discharging path of the battery pack and serves as a component for blocking the charging/discharging current by fusing off when an abnormal situation occurs at the battery pack. The current sensor 412, the relay 413 and the fuse 414 may exchange information with the BMS 411 and be controlled by the BMS 411.

Also preferably, two or more bent portions 510 and two or more insert grooves 420 may be formed. This will be described below in more detail with reference to FIGS. 9 and 10.

Figure 9:
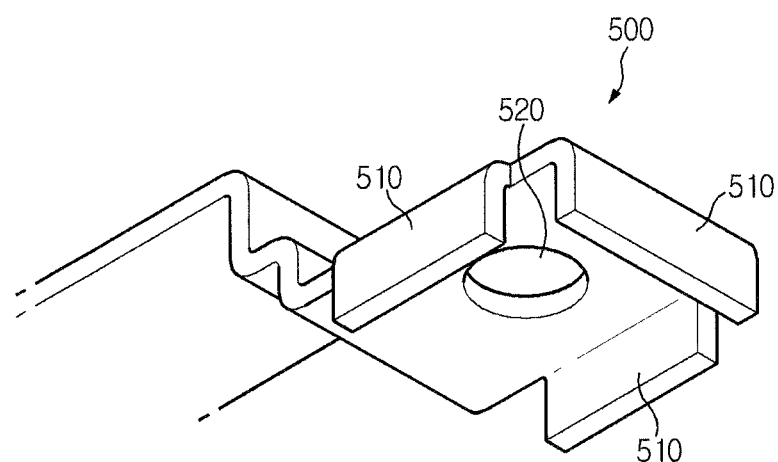
FIG. 9 is a perspective view schematically showing an end portion of a bus bar according to another embodiment of the present disclosure, which is observed from the below.
Figure 10:
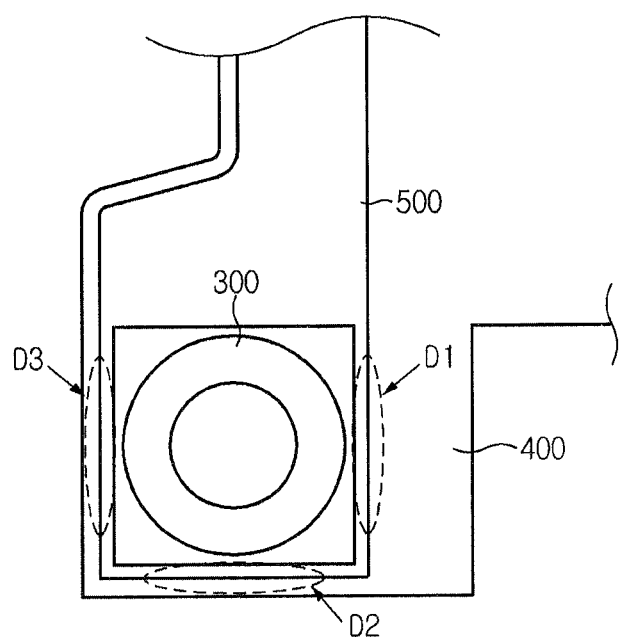
FIG. 10 is a top view schematically showing that the bus bar of FIG. 9 is coupled to a center plate.

FIG. 9 is a perspective view schematically showing an end portion of a bus bar 500 according to another embodiment of the present disclosure, which is observed from the below, and FIG. 10 is a top view schematically showing that the bus bar 500 of FIG. 9 is coupled to a center plate 400.

First, referring to FIG. 9, the bus bar 500 may have a plurality of bent portions 510, for example three bent portions 510. In addition, among these three bent portions 510, one bent portion 510 may be provided at a terminal of the other end (a right end on FIG. 9) of the bus bar 500 and two bent portions 510 may be provided to both sides thereof, each by each. In particular, all of the bent portions 510 may be shaped to be bent in a lower direction.

When the bus bar 500 is coupled to the center plate 400, these three bent portions 510 may be located at portions indicated by D1, D2 and D3 in FIG. 10. In addition, corresponding to the shape of the bent portion 510 of the bus bar 500, the center plate 400 may include a plurality of insert grooves 420, namely three insert grooves 420. Therefore, the insert grooves 420 of the center plate 400 may be formed at the portions indicated by D1, D2 and D3 in FIG. 10. Therefore, in this configuration of the present disclosure, the bent portions 510 of the bus bar 500 may be inserted into the insert grooves 420 of the center plate 400 at three locations indicated by D1, D2 and D3 in FIG. 10.

As in this embodiment, if a plurality of bent portions 510 and a plurality of insert grooves 420 are formed, the torque may be more strongly supported due to the coupling between the bent portions 510 and the insert grooves 420. In other words, since the coupled configuration of the plurality of bent portions 510 and the plurality of insert grooves 420 distributes and supports the torque applied to the terminal bolt 300, the torque applied to the terminal bolt 300 may be supported more strongly, and the force applied to the bus bar 500 and the center plate 400 is distributed, thereby more effectively preventing the bus bar 500, the center plate 400 and the terminal bolt 300 from being damaged or deformed due to the torque.

Figure 11:
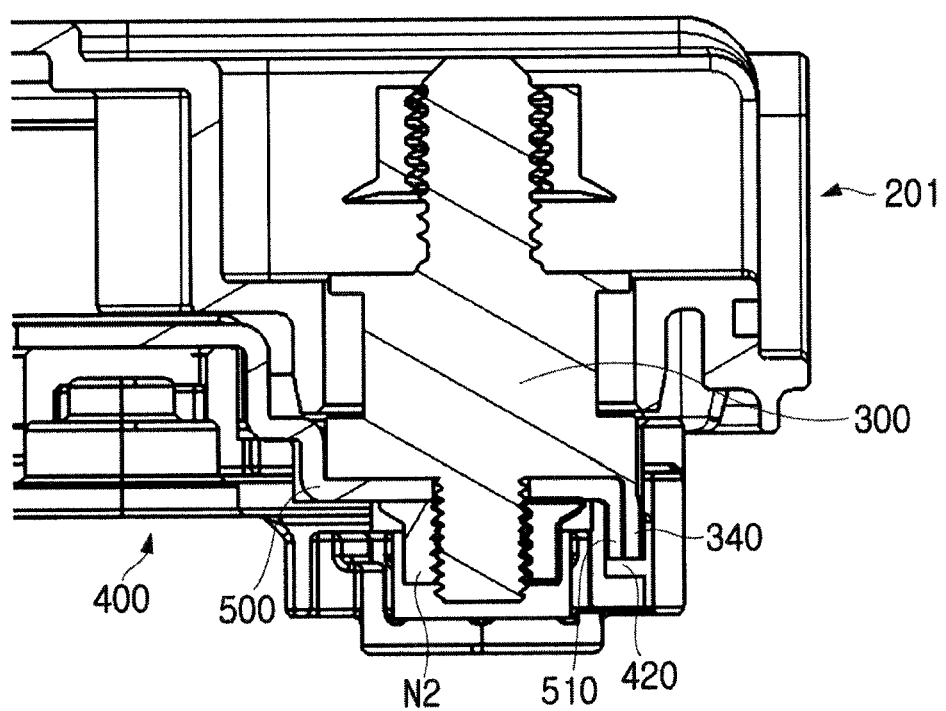
FIG. 11 is a cross-sectional view schematically showing that a bus bar according to another embodiment of the present disclosure is coupled to a terminal bolt.

FIG. 11 is a cross-sectional view schematically showing that a bus bar 500 according to another embodiment of the present disclosure is coupled to a terminal bolt 300. In particular, the configuration of FIG. 11 may be regarded as another embodiment of FIG. 8.

Referring to FIG. 11, in the battery pack according to the present disclosure, the terminal bolt 300 may have a cover protrusion 340. The cover protrusion 340 is configured to protrude in a predetermined direction on a part of the terminal bolt 300 to surround the terminal of the bus bar 500. In particular, as shown in FIG. 1, if the right tip of the bus bar 500 is bent in a lower direction and the bent portion 510 is inserted into the insert groove 420 of the center plate 400, the cover protrusion 340 may be formed on a lower portion of the right side of the body 310 of the bus bar 500 to protrude in a lower direction, and the cover protrusion 340 may surround the right tip of the bus bar 500, namely the bent portion 510 of the bus bar 500, an outer side (a right side in FIG. 11). At this time, the cover protrusion 340 of the terminal bolt 300 may also be inserted into the insert groove 420 of the center plate 400 together with the bent portion 510 of the bus bar 500.

In this embodiment of the present disclosure, since the cover protrusion 340 of the terminal bolt 300 is inserted into the center plate 400 while surrounding the bus bar 500, the torque applied to the terminal bolt 300 when the nut N1 is coupled may be supported, thereby relieving the torque applied to the terminal bolt 300. Moreover, since a contact area between the terminal bolt 300 and the bus bar 500 increases, an electric connection may be stably maintained, and an electric resistance may be reduced.

The battery pack according to the present disclosure may be applied to a vehicle such as an electric vehicle and a hybrid-electric vehicle. In other words, the vehicle according to the present disclosure may include the battery pack as described above. In particular, in the battery pack according to the present disclosure, even though strong vibrations and impacts are frequently applied while the vehicle is running, the torque applied to the terminal bolt 300 is supported due to various structures. Therefore, it is possible to prevent the terminal bolt 300 and various peripheral parts such as the bus bar 500 from being broken down, damaged or deformed due to the torque.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, the terms indicating up, down, left and right directions are used in the specification, but it is obvious to those skilled in the art that these merely represent a relative location and may vary based on a location of an observer or a shape in which an object is placed.

| Reference Symbols | |
|---|---|
| 100: cell assembly | 110: electrode terminal |
| 111: positive electrode assembly terminal | |
| 112: negative electrode assembly terminal | |
| 200: pack housing | 201: upper housing |
| 202: lower housing | 300: terminal bolt |
| 301: positive electrode terminal bolt | 302: negative electrode terminal bolt |
| 310: body | 320: upper protrusion |
| 330: lower protrusion | 340: cover protrusion |
| 400: center plate | 420: insert groove |
| 500: bus bar | 501: positive electrode bus bar |
| 502: negative electrode bus bar | 510: bent portion |

What is claimed is:

1. A battery pack, comprising:
   a cell assembly having a plurality of secondary batteries;
   a pack housing having an inner space to accommodate the cell assembly therein;
   a terminal bolt configured to protrude out of the pack housing;
   a center plate located at an upper portion of the cell assembly in the inner space of the pack housing and having an insert groove formed in the center plate; and
   a bus bar having a length and a width, the length being greater than the width, a first end and a second end spaced from the first end in a length direction, a first section electrically connected to an electrode terminal of the cell assembly and a second section connected to the terminal bolt by contact,
   wherein the second section of the bus bar has a bent portion connected to the second end of the bus bar, the bent portion being inserted into the insert groove of the center plate, and
   wherein the center plate has a top surface to support the second section, a first side wall and a second sidewall, the second sidewall spaced from the first sidewall to form the insert groove.

2. The battery pack according to claim 1, wherein the bent portion is bent in a lower direction, the insert groove of the center plate is formed in a lower direction, and the bent portion is inserted into the insert groove in a lower direction from an upper side.

3. The battery pack according to claim 1, wherein the bus bar has at least two bent portions and at least two insert grooves formed therein.

4. A battery pack, comprising:
   a cell assembly having a plurality of secondary batteries;
   a pack housing having an inner space to accommodate the cell assembly therein;
   a terminal bolt configured to protrude out of the pack housing;
   a center plate located at an upper portion of the cell assembly in the inner space of the pack housing and having an insert groove formed in the center plate; and
   a bus bar having a first section electrically connected to an electrode terminal of the cell assembly and a second section connected to the terminal bolt by contact, the second section of the bus bar inserted into the insert groove of the center plate,
   wherein the center plate has a top surface to support the second section, a first side wall and a second sidewall, the second sidewall spaced from the first sidewall to form the insert groove, and
   wherein the terminal bolt has a body, a cover protrusion extending from the body, the cover protrusion inserted into the insert groove together with the bent portion.

5. The battery pack according to claim 1, wherein the terminal bolt has a body, an upper protrusion and a lower protrusion.

6. The battery pack according to claim 5, wherein a thread is formed in an outer side of the upper protrusion for the coupling of a nut thereto.

7. The battery pack according to claim 5, wherein a coupling hole is formed in the second section of the bus bar, and
   wherein the lower protrusion of the terminal bolt passes through the coupling hole of the bus bar, and a thread is formed in an outer side of the lower protrusion.

8. The battery pack according to claim 5, wherein the bus bar comes into contact with at least a part of a lower surface of the body of the terminal bolt and at least a part of a side of the body of the terminal bolt.

9. The battery pack according to claim 1, wherein the bus bar is placed on an upper portion of the center plate.

10. The battery pack according to claim 1, wherein at least one of a battery management system (BMS), a current sensor, a relay and a fuse is mounted to an upper portion of the center plate.

11. The battery pack according to claim 1, wherein the terminal bolt protrudes out through a through hole of the pack housing, and a sealing member for sealing a space between the terminal bolt and the through hole is further provided.

12. A vehicle, which comprises the battery pack defined in claim 1.

13. The battery pack according to claim 1, further comprising an aperture in the second section of the bus bar to receive the terminal bolt.

14. The battery pack according to claim 1, further comprising three bent portions connected to the second section of the bus bar.

* * * * *